June 9, 1964     D. E. RANDALL     3,136,160

TEMPERATURE AVERAGING PROBE

Filed June 30, 1960

Inventor

DUANE E. RANDALL

By Cornelius J. Husar
R. J. Tompkins    Agent
                 Attorney

United States Patent Office 3,136,160
Patented June 9, 1964

3,136,160
TEMPERATURE AVERAGING PROBE
Duane E. Randall, Albuquerque, N. Mex., assignor, by mesne assignments, to the United States of America as represented by the Secretary of the Navy
Filed June 30, 1960, Ser. No. 40,125
2 Claims. (Cl. 73—339)

The present invention relates to a temperature averaging probe and more particularly to a temperature averaging probe which is capable of giving more accurate temperature reading than previously attainable.

In the operation of a jet engine accurate temperature readings are of prime concern to the pilot of the aircraft. For example, if the engine is at its maximum operating temperature, it will put the pilot on notice that an increase in the amount of fuel being supplied to the burners is not permissible at this time. The purpose of limiting the amount of fuel being supplied to the burners is to keep the engine temperature within its maximum operating temperature.

However, if the temperature sensing element is not giving a true reading of the engine temperature, and the engine temperature is, in fact, higher than the reading given, the pilot, unaware of this, may increase the amount of fuel being supplied to the burner, thus increasing the engine temperature and possibly burning the engine out.

On the other hand, if the temperature reading is higher than the true temperature of the engine, the pilot, noting the high temperature, will refrain from increasing the fuel to the burners, and in a combat situation, the loss of the aircraft may be suffered due to the lack of sufficient engine thrust.

In either case, it can readily be seen that accurate temperature readings are of prime importance for the proper and efficient operation of an engine both in combat and in normal flight of an aircraft.

Prior to this invention it has been the practice in the art to insert a plurality of thermal sensing elements into the path of the combustion gases at varying radii from the center of the path of the combustion gases and getting a plurality of readings, then taking an average of these temperatures to get the average temperature. Such a practice requires additional thermal sensing elements, increasing the cost, and it also presents the problem of mounting and sealing these additional thermal sensing elements.

The present invention eliminates the above noted disadvantages by encasing the thermal sensing element in a tube or probe which protrudes into the path of the gases a sufficient distance to take a cross-sectional sampling of the gases passing therethrough. The tube or well serves as a gas collector permitting the gases to thoroughly mix, then the gases pass through an internal venturi which is mounted in the upper portion of said tube wherein additional mixing takes place. In this upper portion, the gases come into contact with a thermal sensing element, thus giving a true reading as to the average total temperature within the path of the combustion gases.

An object of the present invention is the provision of a thermal element which provides accurate temperature readings.

A further object of the invention is to provide a thermal element with a collector tube which permits a maximum amount of mixing of the combustion gases prior to their coming into contact with the thermal element.

Still another object of the present invention is the provision of a collector tube with a plurality of inlets permitting a maximum cross-sectional sampling of the gases to enter at various radii from the center of the gas path.

Other objects and many of the attendant advantages of this invention will be readily appreciated as the same becomes better understood by reference to the following detailed description when considered in connection with the accompanying drawings wherein.

Figure 1:
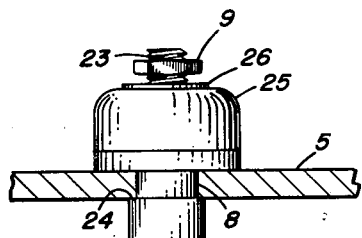
FIG. 1 is a diagrammatic view showing a gas probe mounted in the tail end of a jet engine.
Figure 1:
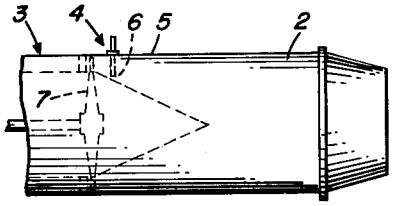

Referring to the drawings, wherein like reference characters designate like or corresponding parts throughout the several views, there is shown in FIG. 1 the tail end 2 of a jet engine 3 with the forward portion of the engine 3 cut away.

A temperature probe 4 extends through the shell 5 of the engine 3 into the path of the gases 6. The temperature probe 4 is shown mounted downstream of the turbine 7; however, the present invention is not to be limited to any specific location of mounting said temperature probe.

Figure 2:
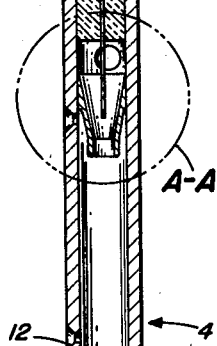
FIG. 2 is an enlarged vertical partially sectional view showing the construction of the gas probe indicated in FIG. 1.

FIG. 2 is an enlarged vertical sectional view illustrating the design and mounting of the temperature probe 4. The probe 4 is fixedly secured in aperture 8 of the shell 5 and is shown as being held in position by a nut 9 which threads onto the uppermost end 23 of the collecting tube 11. The tube 11 is provided with a shoulder 24 which abuts the underside of the engine shell 5 when the nut 9 is tightened. Intermediate the shoulder 24 and the nut 9 is a cap 25 and a washer 26. As the nut 9 is tightened the washer 26 and cap 25 transfer the force over a larger area and also serve as a protective cover. Although this method is shown, any other suitable means of attachment may be used. The collecting tube 11 extends into the path of the gases 6 a considerable distance so as to collect an adequate sample of the gases passing therethrough, the collecting tube 11 being provided with a plurality of upstream probe holes 12 and closed at its lowermost end 13.

The size and tolerance of the holes 12 have been fixed as a result of an effort to have the upstream holes 12 act as a metering orifice and thereby minimize the effects of variations in upstream total pressure. Also the bore 14 of the probe 11 was made as large as practicable to minimize the air velocity internally.

As pointed out above the probe holes 12 face upstream into the path of the gases 6 and thus the gases mix within the bore 14 of the probe 11.

Figure 3:
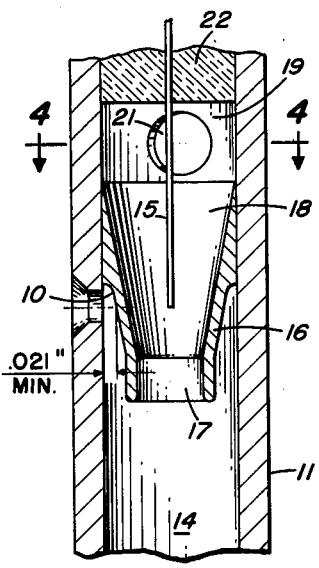
FIG. 3 is an enlarged sectional view of the area encircled by circle A—A in FIG. 2.

FIG. 3, which is an enlarged sectional view of the area encircled by the circle A—A in FIG. 2, shows the collecting tube 11 with the thermal sensing element 15. Thermal element 15 is surrounded by an internal venturi 16 which has an inlet 17 and an outlet 18 which leads to the chamber 19 from which the gases may exit via vent apertures 21 into the gas stream again.

The clearance between the inner diameter of the tube 11 and the outer surface 10 of the venturi 16 at the point where the centerline of the uppermost probe hole 12 strikes the outer surface 10 of the venturi tube 16 should be at least .021 inch to permit the gases entering through probe hole 12 to flow downwardly between the venturi 16 and the inner diameter of tube 11 toward the venturi inlet 17.

The upper portion of the collecting tube 11 is provided with a suitable insulating material 22 to insulate the thermal element 15 from the surrounding environment to give a reading that is not influenced by the relatively cool shell 5 or the outer atmosphere.

Figure 4:
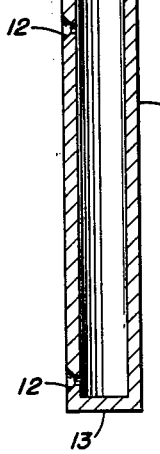
FIG. 4 is a sectional view taken on the line 4—4 of FIG. 3.
Figure 4:
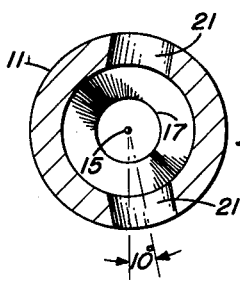

FIG. 4, which is a sectional view taken on the lines 4—4 of FIG. 3, illustrates the angle on which the vent apertures 21 are bored, the angle being approximately 10° off center, thereby giving the apertures a rearward rake. The vent apertures 21 are located on the sides of the collecting tube 11 at this particular angle to minimize radiation effects from the afterburner flame (not shown).

In operation, the temperature probe 4 is inserted into the bore 8 in the shell 5 and secured in position by the locking nut 9. In installing the temperature probe 4, care must be taken to insure that the probe holes 12 are facing in an upstream direction into the path of the gases 6.

After the probe 4 is mounted in the shell 5, the gases will enter into the bore 14 of the collecting tube 11 through the probe holes 12. Once the gases are within the collecting tube 11 they intermix and move upwardly through the collecting tube 11 toward the venturi 16. The gases then flow through the venturi inlet 17 toward the thermal sensing element 15, and it is within venturi 16 that the gases are further mixed prior to their coming into contact with the sensing element 15. After passing the end of thermal sensing element 15 the gases enter chamber 19 and exit therefrom via vent apertures 21 and return to the path of combustion gases 6.

Obviously many modifications and variations of the present invention are possible in the light of the above teachings. It is therefore to be understood that within the scope of the appended claims, the invention may be practiced otherwise than as specifically described.

What is claimed is:

1. A gas probe comprising a collecting tube adapted to be inserted through the wall of a gas duct and fixedly secured thereto, said collecting tube extending into said duct normal to the flow of gases flowing therethrough, the internal portion of said collecting tube being of uniform diameter and being unobstructed except in its uppermost area, a wall at the lowermost end of said gas collecting tube preventing the exit of gases therethrough, a plurality of upstream facing inlets spaced at predetermined distances along the longitudinal axis of the collecting tube, a venturi having an inlet and outlet mounted within the upper portion of said collecting tube with its supporting portion bearing on the wall of said bore immediately above said uppermost inlet, a plurality of outlets located above said venturi thereby requiring all of the gases to pass through said venturi prior to leaving said collector tube, a chamber adjacent said venturi outlet, a plurality of rearwardly raked outlets extending through the walls of said chamber permitting the gases to exit therethrough, and a thermal element extending into said venturi, the sensing end of said thermal element being free from contact with its surroundings, the upper end of said thermal element supported in insulated relationship with the cap portion of said probe, said thermal element providing accurate temperature readings of the gases flowing through said duct due to the intimate contact of said gases with said thermal element.

2. A gas probe comprising a collecting tube adapted to be inserted through the wall of a gas duct and fixedly secured thereto, said collecting tube extending into said duct normal to the gases flowing therethrough, the internal portion of said collecting tube being of uniform diameter and being unobstructed throughout its length except for its uppermost area, a closure of the lowermost end of said gas collecting tube, inlet means facing in an upstream direction, mixing means comprising a venturi mounted in the upper portion of said collecting tube, said venturi having a supporting portion which bears upon the bore of said tube and a minimum clearance of .021 inch exists between the internal diameter of said tube and the outer portion of said venturi, said venturi mixing means being positioned in said collecting tube in such a manner that the gases may exit from said collecting tube only after passing through said venturi, outlet means at the uppermost end of said tube beyond said venturi mixing means, said outlet means comprising a plurality of apertures bored at an angle of approximately 10° rearward of a line normal to gas flow, thermal sensing means mounted in insulated relationship with said upper portion of said tube, said thermal sensing means extending inwardly into said venturi mixing means and being fully exposed to said gases passing therethrough, whereby the average temperature of the gases flowing through said duct can be accurately determined.

References Cited in the file of this patent
UNITED STATES PATENTS
2,928,279    Schober _____ Mar. 15, 1960
FOREIGN PATENTS
734,702    Great Britain _____ Aug. 3, 1955
795,238    Great Britain _____ May 21, 1958